No. 748,399. PATENTED DEC. 29, 1903.
J. P. MITCHELL.
MACHINE FOR STRETCHING WIRE HOOPS.
APPLICATION FILED OCT. 5, 1903.
NO MODEL. 3 SHEETS—SHEET 1.
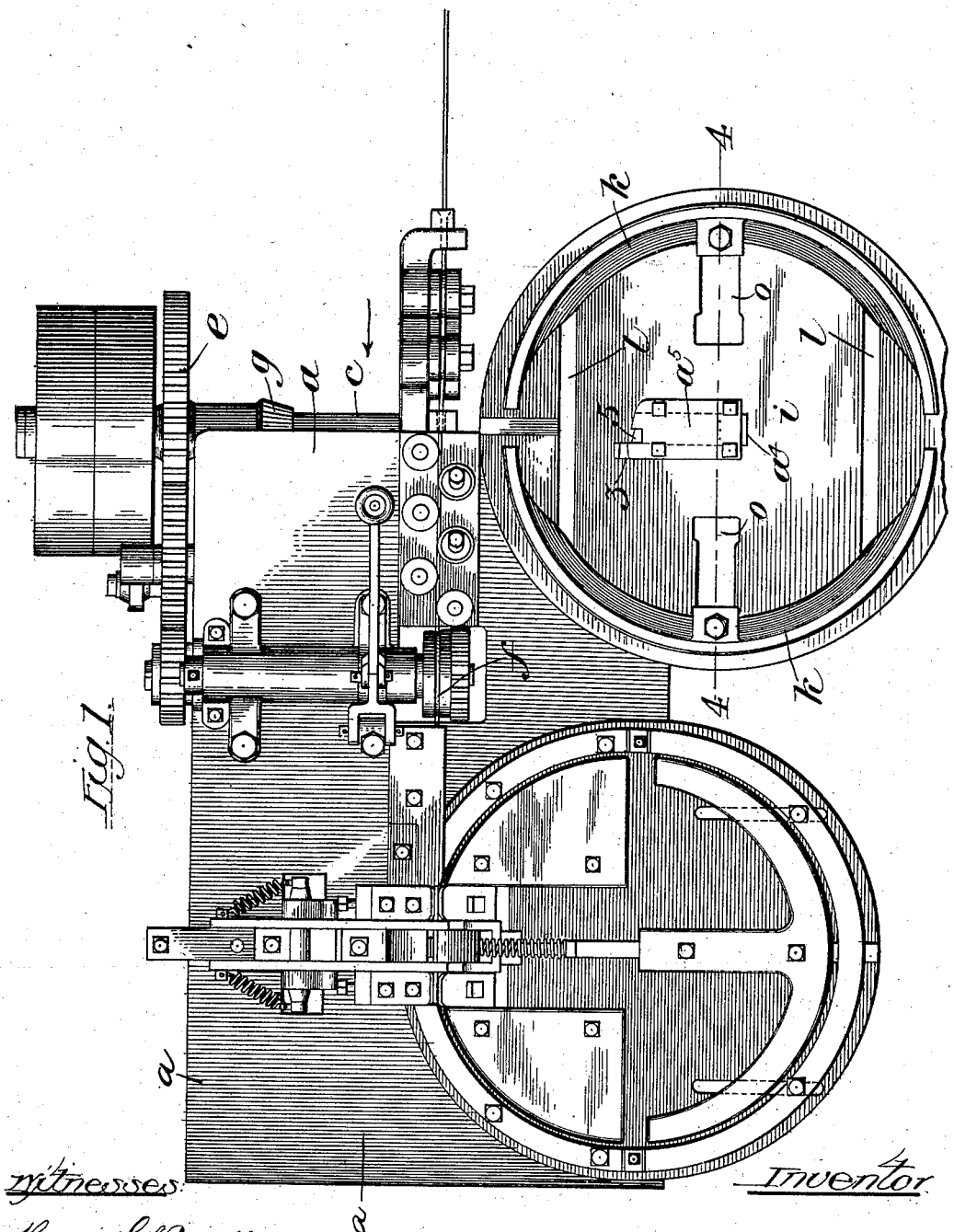

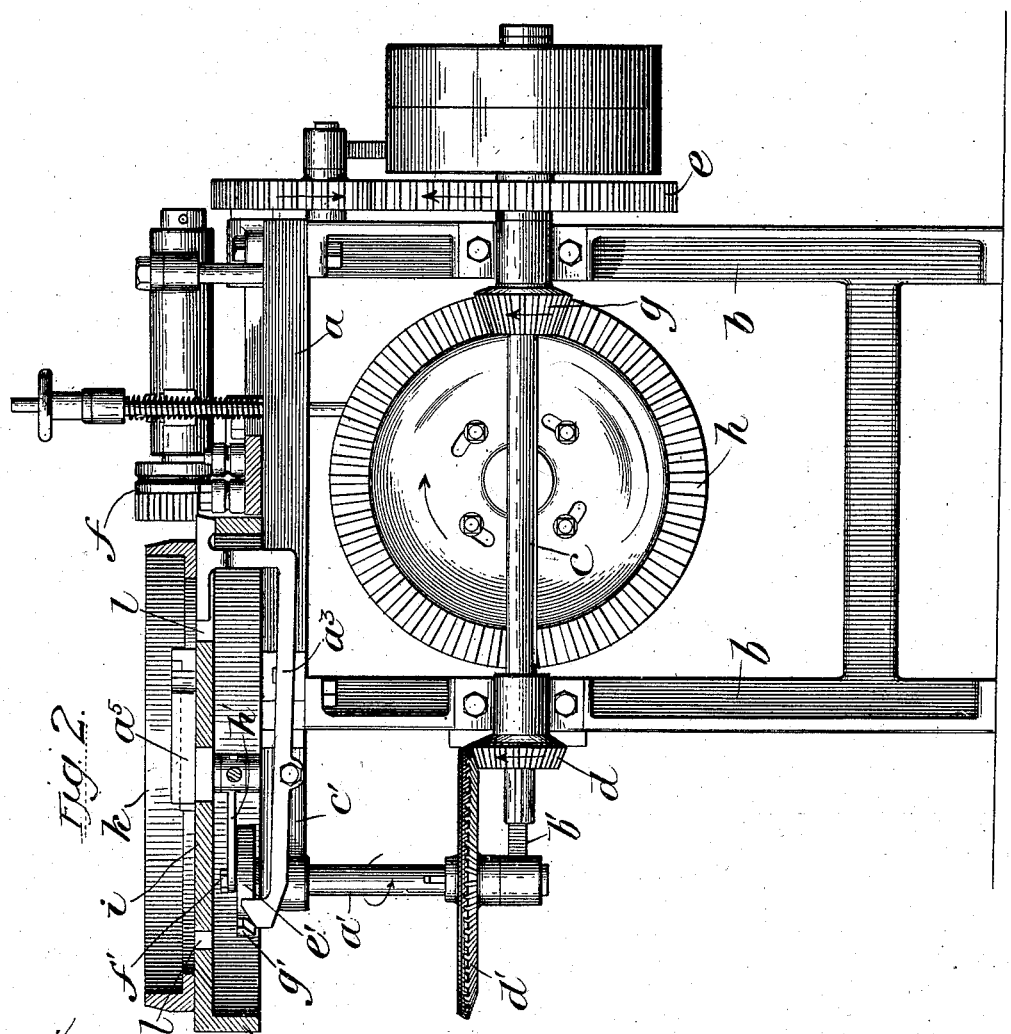

No. 748,399. PATENTED DEC. 29, 1903.
J. P. MITCHELL.
MACHINE FOR STRETCHING WIRE HOOPS.
APPLICATION FILED OCT. 5, 1903.
NO MODEL. 3 SHEETS—SHEET 3.
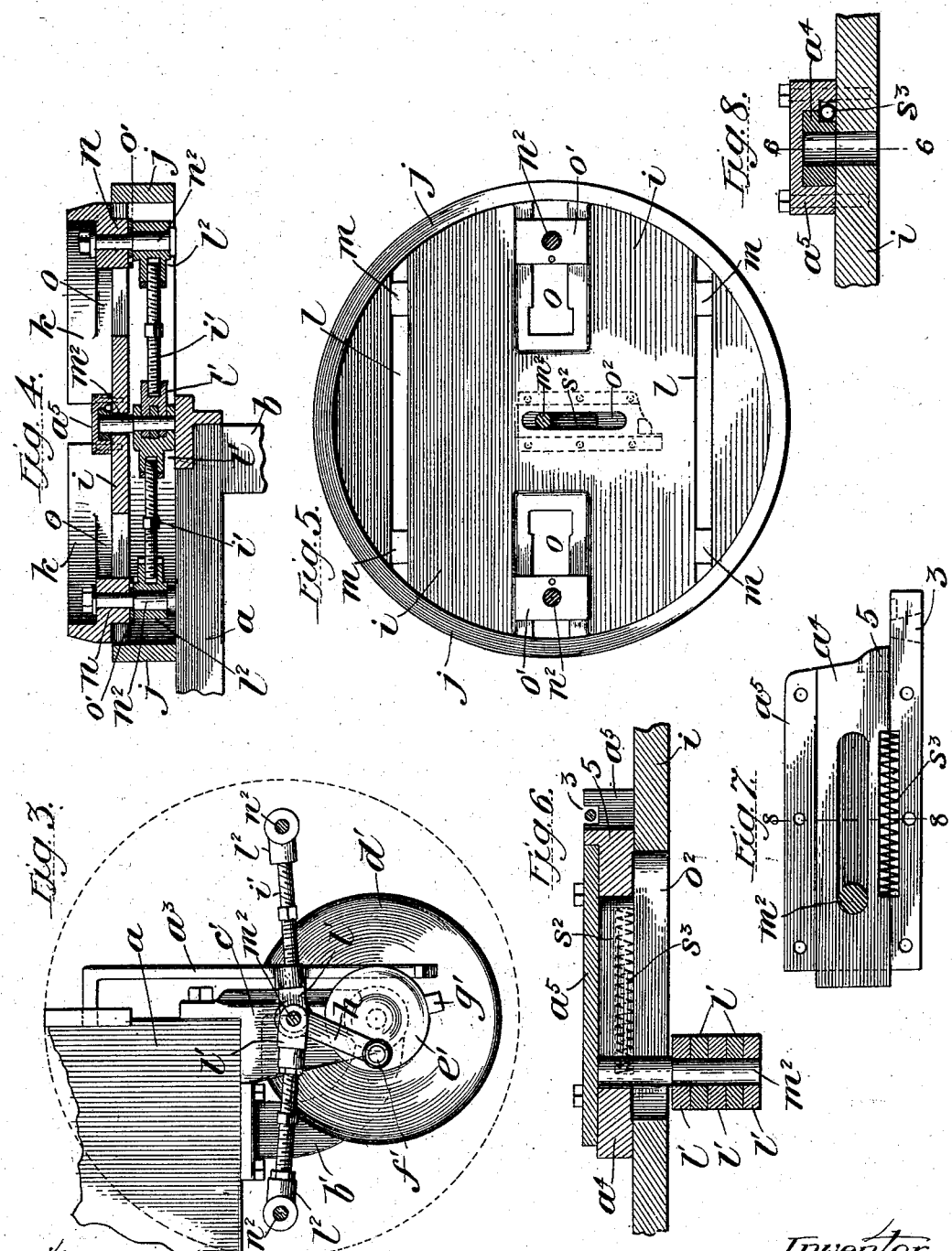
Witnesses:
Harold G. Barrett
Luter S. Alter
Inventor
John P. Mitchell No. 748,399. Patented December 29, 1903.

UNITED STATES PATENT OFFICE.

JOHN P. MITCHELL, OF JOLIET, ILLINOIS, ASSIGNOR TO THE AMERICAN STEEL & WIRE COMPANY, A CORPORATION OF NEW JERSEY.

MACHINE FOR STRETCHING WIRE HOOPS.

SPECIFICATION forming part of Letters Patent No. 748,399, dated December 29, 1903.

Application filed October 5, 1903. Serial No. 175,877. (No model.)

*To all whom it may concern:*

Be it known that I, JOHN P. MITCHELL, a citizen of the United States, residing at Joliet, county of Will, State of Illinois, have invented certain new and useful Improvements in Machines for Stretching Wire Hoops; and I do hereby declare the following to be a full, clear, and exact description of the invention, such as will enable others skilled in the art to which it appertains to make and use the same.

The invention relates to machines for making wire hoops for barrels, kegs, and the like, and has for its object to provide such machines with an attachment for stretching and standardizing as to size the hoops as they are taken from the former or mandrel.

The invention has been designed particularly with reference to the machine embraced in an application filed of even date herewith by Albert J. Bates wherein the wire is fed endwise around the interior of a mandrel or former until the leading end overlaps the running part and forms a complete hoop, after which the lapped ends are seized, the hoop part of the wire is severed from the supply part, and the overlapped ends are twisted together. In these machines it is practically impossible, owing to variations in the size, tension, and temper of the wire, to have the hoops of uniform size as they leave the former. Moreover, the action of the twister and the gripper-jaws throws that part of the hoop where the ends are twisted together out of a true circle and leaves the heaviest part of the hoop flat and comparatively straight. It is therefore usual to equip these machines with stretching attachments; and the present invention comprises an improved form of such device and consists in the construction hereinafter described and claimed, and illustrated in the accompanying drawings, wherein—

Figure 1 shows the Bates machine in plan with my stretcher applied thereto. Fig. 2 is an end view thereof, partly in section, looking in the direction of the arrow in Fig. 1. Fig. 3 is a plan of the mechanism for expanding and contracting the stretcher. Fig. 4 is a vertical section on the line 4 4, Fig. 1. Fig. 5 is a bottom plan view of the stretcher baseplate. Fig. 6 is a sectional detail of the cutter for trimming the ends of the hoop on the line 6 6, Fig. 8. Fig. 7 is a bottom plan of the cutter; and Fig. 8 is a cross-section of the same on the line 8 8, Fig. 7.

I do not deem it necessary to describe the hoop-forming mechanism of the Bates machine, as my attachment is dependent thereon only in the sense that it is operated by the main shaft of the machine, and especially as the invention is applicable to other hoop-making machines and may even be operated independently of any other machine.

Referring to Figs. 1 and 2, $a$ denotes the bed or table of the Bates machine, and $b$ the supporting-frame thereof. The main shaft $c$ extends across one end of the machine and has driving-pulleys at one end and a pinion $d$ at the other. The shaft $c$ is also provided with a gear-wheel $e$, which drives the feedrolls $f$, and a bevel-pinion $g$, which drives the large gear $h$, from which the hoop forming, twisting, cutting, gripping, and discharging devices of the Bates machine are operated.

The stretching device of the present application is preferably mounted at one corner of the table $a$, as best shown in Fig. 1. It comprises a circular plate $i$, having a depending rim $j$, which raises it slightly above the table and enables the operating mechanism hereinafter described to be located under the plate, and thereby housed and protected. Upon the upper surface of the plate $i$ are mounted two semicircular rings $k$ $k$, that are slightly beveled, as shown in Fig. 4, and are set with their ends opposite each other, so that together they form substantially a complete circle. The plate $i$ is provided with parallel slots $l$ $l$, extending across it, one on each side of the center, and each of the rings $k$ $k$, has a pair of lugs $m$ $m$ depending from the under side and fitting snugly in the slots, so as to slide freely therein. The rings also have at diametrically opposite points other lugs $n$ $n$, by means of which connection is made with their operating mechanism, and these lugs also extend through slots $o$ $o$ in the plate $i$, these slots being arranged parallel with the other slots, but in line with each other on opposite sides of the center of the plate and rings.

The lugs $m$ $m$ are merely to guide the rings as they are moved to stretch the hoops;

but the lugs $n\,n$, although their primary function is as above described, are utilized to hold the rings down on the plate and prevent them from rising or being accidentally dislodged. For this purpose each lug $n$ has a small plate $o'$ secured to its under side after the lug has been passed through its slot, and the plates $o'$ $o'$ have their ends extended beyond the edges of the slots, as shown in Fig. 5, so as to prevent them from rising out of the slots, and consequently holding the rings down close on the plate, but allowing them to slide more freely toward and from each other.

The means for operating the stretching-rings comprises a shaft $a'$, mounted vertically in horizontal brackets $b'\,c'$, projecting from the machine-frame. The shaft has at its lower end a bevel-gear $d'$, which is driven by the pinion $d$, already described, and at its upper end it has a disk $e'$, provided on top with a wrist-pin $f'$ and on its edge with a cam $h'$. The wrist-pin is connected by a link $h'$ with each of the stretching-rings, so that as the disk revolves the rings will be automatically drawn toward each other to receive the hoops and immediately thrust away from each other, so as to enlarge the diameter of the circle and stretch the hoop which has meantime been placed upon it by hand. The connection between the rings and the link $h'$ is made by adjustable screw-rods $i'\,i'$, each of which is tapped at opposite ends into couplings $l'\,l'$ and $l^2\,l^2$, the former being hinge-connected together and to the end of the link $h'$ by a pin $m^2$, and the latter being connected to the stretching-rings by bolts $n^2\,n^2$, that pass down through the lugs $n\,n$ and have heads on their lower ends and nuts and washers at their upper ends, as shown in Fig. 4. The pin $m^2$ is guided in a slot $o^2$ in the table $i$ at right angles to the slots which guide the rings and determine the direction of their movement, and the length of the link $h'$ and the throw of the wrist-pin $f'$ is such that as the disk $e'$ revolves the pin $m^2$ passes back and forth across the dead-center between the bolts $n^2\,n^2$ and alternately draws the stretching-rings together and thrusts them apart.

Figs. 2 and 3 show a device for discharging the hoops after they have been stretched. It operates to lift each hoop up and push it off the stretching-rings when they are drawn together, as above described. It comprises a lever $a^3$, pivoted midway of its length to the bracket $c'$ and having its ends $b^3$ extended into the path described by the cam $g'$ on the disk $e'$ as the shaft $a'$ rotates. At its other end the discharger-lever is bent, as shown in Fig. 2 and 3, and extends beyond the periphery of the rings, so that whenever the lever is operated to throw up this end the hoop that encircles the ring will be pushed up over the ends, so as to be easily removed by hand.

In the operation of wire-hoop-making machines it frequently happens that the leading end of the wire overlaps the running-strand so far that when the loop is completed it projects beyond the twisted portion, and as it is desirable that this should be trimmed off I provide the present attachment with a cutter for this purpose. This cutter is best shown in Figs. 6, 7, and 8. It comprises a plate $a^4$, sliding in a rectangular housing $a^5$, bolted down on the plate $i$ in the center of the stretching-rings and immediately over the slot $o^2$ in the plate, in which the pin $m^2$ plays back and forth. One of the vertical edges of the housing is extended beyond the end and is notched, as shown at 3 in Figs. 1 and 7, the object of this notch being to receive the ragged projecting end of the twisted portion of the hoop already referred to. The plate $a^4$ has a knife or cutting edge 5, which coöperates with the edge of the notch 3 to sever the wire in a well-known manner. The cutter is operated automatically by the same wrist-pin and link which actuates the stretching-rings, and for this purpose the knife-plate $a^4$ is slotted, as at $s^2$, and the head of the pin $m^2$ is extended upward through the slot $o^2$ in the plate $i$ into it, so that after the pin has moved a considerable distance (or until there is just about movement enough left in the pin to operate the cutter) it engages one end of the slot and causes the cutter to sever the end of any hoop that may be placed by hand in the notch 3. The return or inoperative stroke of the cutter is caused by a spring $s^3$, that is housed and concealed in a groove cut partly in the knife-plate and partly in the housing $a^5$, as clearly shown in Figs. 7 and 8.

Having thus described my invention, what I claim is—

1. In a machine for stretching wire hoops, the combination of a plate, a pair of semicircular rings guided in slots in the plate, a pin movable at right angles to the movement of the rings, and connections between the rings and pin whereby as the pin crosses the dead-center between the rings the latter are moved.

2. In a machine for stretching wire hoops, the combination with the plate $i$ having parallel guide-slots $l$, $l$, and the slots $o$, $o$ in line with each other, of the semicircular rings $k$, $k$ sliding on the plate and having lugs projecting into the slots $l$, $l$, and lugs $n$, $n$ projecting into the slots $o$, $o$ and connecting to ring-operating means under the plate.

3. In a machine for stretching wire hoops, the combination with a pair of oppositely-disposed semicircular rings, of a revolving shaft having a wrist-pin, rods connected at their outer ends to the rings and extending toward the center, and a link connection between the inner ends of the rods and the wrist-pin.

4. In a machine for stretching wire hoops, the combination with the plate $i$ provided with slots $o$, $o$, of the semicircular rings $k$, $k$, the disk $e'$ having the wrist-pin $f'$, the link $h'$ connected at one end to the wrist and having a pin $m^2$ at the other, and the rods $i'$, $i'$ connecting the pin $m^2$ with the rings.

5. In a machine for stretching wire hoops, the combination with the plate $i$ having slots $o$, $o$ in line with each other and the slot $o^2$ at right angles to and between the slots, of the semicircular rings $k$, $k$ having lugs extending into the slots $o$, $o$, a pin sliding in the slot $o^2$, and connections between the pin and the lug on the rings.

6. In a machine for stretching wire hoops, the combination of a pair of oppositely-disposed stretching-rings, means for moving them toward each other to receive the hoops and apart to stretch them, a discharger pivoted under the rings, and means for operating the discharger when the rings are moved toward each other.

7. In a machine for stretching wire hoops, the combination with the stretching-rings, and means for moving them toward and from each other, of the pivoted discharger-lever $a^3$, the disk $e'$, and the cam $g'$ arranged to strike the lever and cause the discharger to push the hoop off the rings.

8. In a machine for stretching wire hoops, the combination with a pair of oppositely-disposed stretching-rings, means for moving the rings toward and from each other, and a cutter located in the space between the rings and operated by the same means that operates the rings.

9. In a machine for stretching wire hoops, the combination of the plate $i$, a pair of stretching-rings guided to move toward and from each other on the plate, a slot in the center of the plate between the rings and at right angles to their movement, a pin sliding in said slot and connected to each ring, a cutter inclosed in a housing above the plate and connected to the sliding pin, a rotating shaft having a disk, and a crank-pin on the disk link-connected to the sliding pin.

In testimony whereof I affix my signature in presence of two witnesses.

JOHN P. MITCHELL.

Witnesses:
  A. C. STONE,
  CHAS. W. LUTZ.